United States Patent [19]

Neudecker

[11] 4,382,663
[45] May 10, 1983

[54] DIAPROJECTOR

[75] Inventor: Karl Neudecker, Munich, Fed. Rep. of Germany

[73] Assignee: Agfa-Gevaert Aktiengesellschaft, Leverkusen, Fed. Rep. of Germany

[21] Appl. No.: 257,409

[22] Filed: Apr. 24, 1981

[30] Foreign Application Priority Data

Apr. 30, 1980 [DE] Fed. Rep. of Germany ....... 3016757

[51] Int. Cl.³ ............................................. G03B 23/04
[52] U.S. Cl. .................................... 353/104; 353/116
[58] Field of Search ............... 353/103, 104, 114, 116, 353/9, 115

[56] References Cited

U.S. PATENT DOCUMENTS

| | | | |
|---|---|---|---|
| 2,969,711 | 1/1961 | Robinson et al. | 353/116 X |
| 3,118,341 | 1/1964 | Weiss et al. | 353/116 X |
| 3,178,998 | 4/1965 | King | 353/104 X |
| 3,501,234 | 3/1970 | Johannsen et al. | 353/104 |
| 3,644,031 | 2/1972 | Bennett | 353/104 X |
| 3,953,119 | 4/1976 | Erchoff | 353/116 |

FOREIGN PATENT DOCUMENTS 2914921 10/1980 Fed. Rep. of Germany ...... 353/104

Primary Examiner—Stephen Marcus
Assistant Examiner—William R. Sharp
Attorney, Agent, or Firm—Michael J. Striker

[57] ABSTRACT

A diaprojector for framed diapositives accommodated in at least two different magazines has two tracks each for a respective one of the magazines having smaller and greater diapositive compartment widths, a drive for gradually transporting each of the magazines by a distance corresponding to the width of the diapositive compartments, a sliding element having a width suitable for exchanging the diapositives in one of the magazines, and a rider having a width suitable for exchanging of the diapositives in the other magazine and displaceable on the sliding element between two positions in which either the sliding element or the rider is available for acting upon the respective magazine, and a sensing device operative for blocking the operation of the projector, when the position of the rider does not correspond to the magazine in which the diapositives must be exchanged.

8 Claims, 2 Drawing Figures

U.S. Patent
May 10, 1983
4,382,663
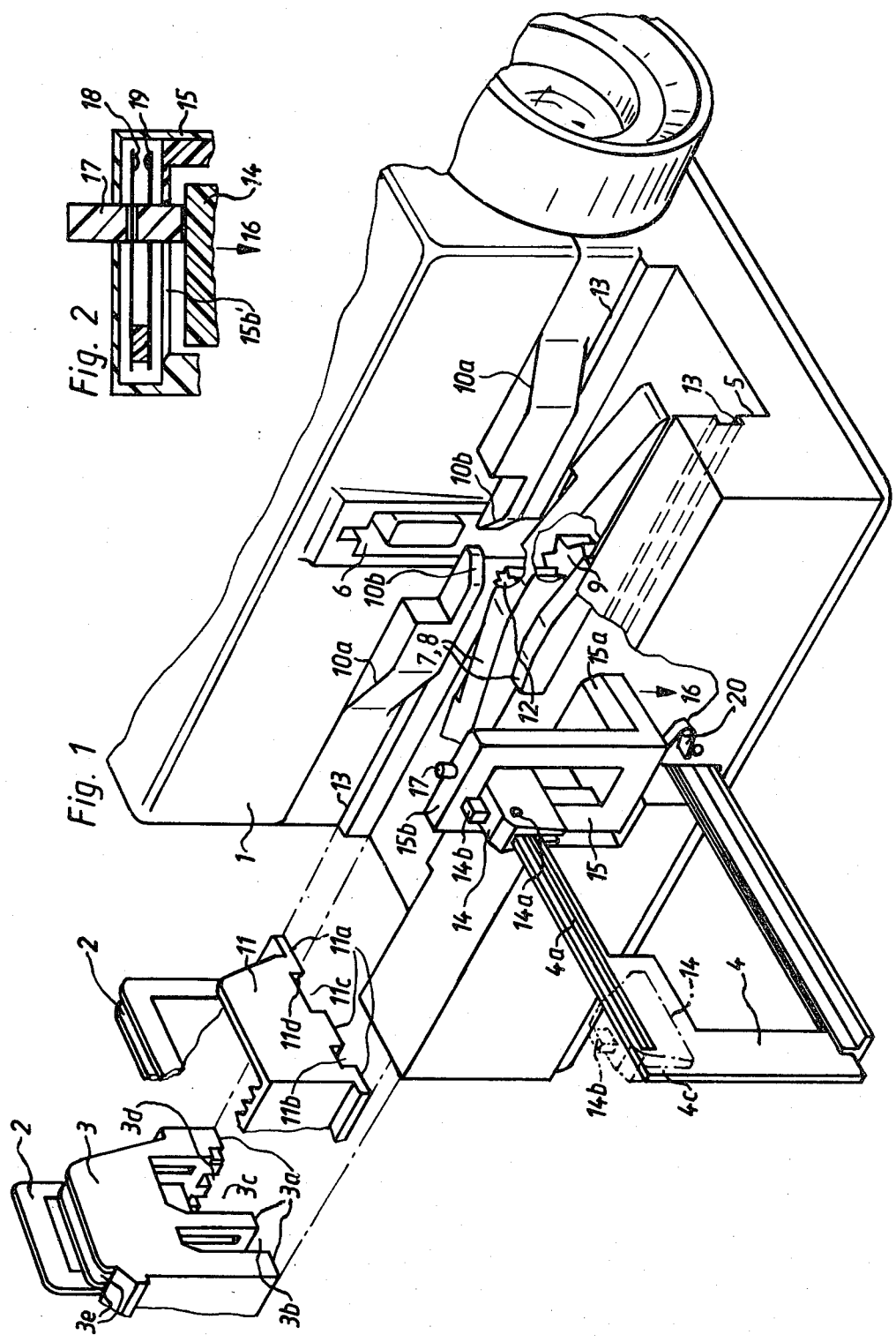

DIAPROJECTOR

BACKGROUND OF THE INVENTION

The present invention relates to a diaprojector for framed diapositives which are arranged in magazines of different types.

Diaprojectors of the aforementioned general type are known in the art. A known diaprojector has motor-operated or hand-operated diapositive exchange means, and means for gradually transporting the magazines by a distance corresponding to the width of one diapositive compartment after withdrawal of a projected diapositive into the magazine. The diapositive exchange means includes a sliding exchange element having a portion extendable into and retractable from the space between the diapositives arranged in a magazine with a smaller diapositive compartment width. This sliding element must displaces a central one of three diapositives and has the width of the above mentioned portion, which is smaller than the distance between one diapositive and the next but one diapositive in this magazine. The diapositive exchange means further includes a rider which is displaceable on the above mentioned portion of the sliding element and particularly toward the end edge of the latter and which has a width exceeding the width of the sliding element or its end edge but smaller than the distance between one diapositive and the next but one diapositive in the magazine with a greater diapositive compartment width, so as to exchange the diapositives in the latter mentioned magazine. In the diaprojector of this construction it is possible that a user forgets to displace the rider in its inoperative position when the magazine with the smaller diapositive compartment width is in its transporting path. As a result of this, the rider can simultaneously engage several diapositives which are located closer to one another in this magazine, which will jam the diapositives in the projector.

SUMMARY OF THE INVENTION

Accordingly, it is an object of the present invention to provide a diaprojector which avoids the disadvantages of the prior art. More particularly, it is an object of the present invention to provide a diaprojector in which the utilization of a magazine with a smaller diapositive compartment width cannot be accompanied by a faulty position of a rider during the operation of the projector.

In keeping with these objects, and with others which will become apparent hereinafter, one feature of the present invention resides, briefly stated, in a diaprojector, in which sensing means is provided operative for sensing the presence of one of the magazines in a certain one of their paths and locking the diaprojector in response to sensing the fact that the rider is in a position which does not correspond to the one magazine in the one path.

When the diaprojector is designed in accordance with the present invention, it is no longer possible that a magazine with a smaller width of the diapositive compartments is located in its path, and at the same time the rider is in its operative position. The above mentioned sensing means eliminates this possibility.

The novel features which are considered characteristic for the invention are set forth in particular in the appended claims. The invention itself, however, both as to its construction and its method of operation, together with additional objects and advantages thereof, will be best understood from the following description of preferred embodiments when read in connection with the accompanying drawing.

BRIEF DESCRIPTION OF THE DRAWING

FIG. 1 is a perspective view of a diapositive projector with two different magazines, in accordance with the present invention; and FIG. 2 is a view showing a fragment of a diapositive in accordance with a further embodiment of the present invention.

DESCRIPTION OF THE PREFERRED EMBODIMENTS

A projector in accordance with the present invention is identified in toto by reference numeral 1 and is utilized for demonstration of framed diapositives 2 which are accommodated in so-called unit magazine 3 and 11.

The magazine 3 has three bottom projections 3a separated from one another by narrower and wider recesses 3b and 3c, respectively. The outer bottom projection which limits the wider recess 3c is provided with a toothed rack 3d. The diapositives 2 accommodated in the magazine 3 rest on the bottom projections 3a and are separated from one another by compartment walls 3e. The height of the compartment walls 3e is considerably smaller than the height of the framed diapositives 2, so that the framed diapositives 2 can be engaged by a hand-operated or motor-operated diapositive exchange sliding element 4 above the compartment walls 3e. The magazine has a side at which these compartments are open, and thereby the magazines can be inserted into the illumination path of rays of the projector 1 and withdrawn back into the magazine.

The projector 1 has a track 5 which is formed as a depression and substantially corresponds to the width of the magazine 3. Two wedges 7 and 8 are provided on a bottom of the track 5 and arranged symmetrically relative to a diapositive insertion opening 6. Thereby the diapositives 2 are gradually lifted during the transportation of the magazine 3, from their position on the bottom projections 3a to the height of the insertion opening 6 and after their demonstration are lowered to the bottom projections 3a again.

A gear 9 mounted on a shaft is arranged in or below the wedge 7 and faces towards the gear rack 3d. The gear 9 is advanced by one tooth with the aid of a motor or by hand, after each exchange of a diapositive via a not shown switching arrangement on the sliding element 4. The advancement by one tooth corresponds to the advancement of the magazine 3 by one diapositive compartment. Both the wedges 10a and 10b are provided at both sides of the insertion opening 6. These serve during the transporting of the magazine for aligning the diapositives 2 in the magazine 3 and also for aligning the diapositive 2 to be projected, with the insertion opening 6.

The second magazine 11 with a smaller distance between the diapositive compartments can also be utilized in the projector 1. The magazine 11 has three bottom projections 11a separated from one another by recesses 11b and 11c. The diapositive compartments in the magazine 11 are also open toward the insertion opening 6. The diapositives 2 also extend outwardly beyond the magazine 11. However, the magazine 11 is wider so that it cannot be inserted into the track 5. A toothed rack 11b of the magazine 11 is located closer to the longitudinal central plane of than in the magazine 3. A gear 12 is arranged in the projector 11 coaxial with the gear 9. Its diameter and position are so dimensioned that the gear 12 engages with the toothed rack 11d during insertion of the magazine 11 into the projector 11 and gradually rotates by one tooth so as to transport the magazine 11 by one diapositive compartment.

In order to provide for a simple advancing device, the toothed racks 3d and 11d and the gears 9 and 12 can be so arranged that the gears 9 and 12 have identical numbers of teeth. The diapositives 2 are not lifted in the magazine 11, but they are laterally withdrawn and inserted. Thereby the magazine 11 must be so inserted into the projection 1 that the supporting surface of the bottom projections 11a lie directly at the highest elevation of the wedges 7 and 8. Thus, the second magazine 11 is not insertable into the track 5. Moreover, steps 13 are provided on the longitudinal sides of the track 5 and form a track for the magazine 11. The height of the steps 13 is so dimensioned that the lower edges of the diapositives accommodated in the magazine 11 rest directly on the wedges 7 and 8 without lifting along the latter and can be inserted by the sliding element 4 into the insertion opening 6. The toothed rack 11d extends into the space between the wall of the depression and the edge 7, so that it can engage with the gear 12.

Since the diapositives 2 in the magazine 11 are arranged narrower and also can be thinner, the sliding element 4 must have such a width which is so small that the sliding element 4 can extend between the narrowly arranged diapositives and displace the diapositives, for example thinner diapositives, into the projecting window of the projector 1 to be projected. This smaller sliding element 4 is, however, not suitable to engage and transport the thicker diapositives in the magazine 3. Because of this, the sliding element 4 is provided with a rider 14 displaceable along the sliding element 4 in a slot 4a. The rider 14 at its side facing away from the insertion opening 6, has a cam 14a. The slider is so wide that it can extend between the diapositives 2 in the magazine 3 and also engage the thicker diapositives 2 of this magazine.

When the magazine 3 is utilized, the rider 14 is displaced on the sliding element 4 in the slot 4a to its end facing toward the insertion opening 6, so that the cam 14a of the rider 4 is arrested at an end side 4c of the sliding element 4. When the magazine 11 is utilized, the rider must be displaced on the sliding element 4 to its end facing away from the insertion opening 6, so that during the operation of the sliding element 4 the rider 14 no longer acts upon the magazine 11, as can be seen in dotted lines in FIG. 1.

In order to provide for correspondence between the position of the rider 14 and the respective magazine 3 or 11, a sensing element 15 is provided. The sensing element 15 is pressed under action of a spring 20 in a direction opposite to the direction identified by the arrow 16. The sensing element 15 is provided with a trapezoidal supporting surface 15a extending in the track 13 for the magazine 11 with the smaller diapositive compartment width. The sensing element 15 has a bracket-shaped part 15b which overlaps both the transporting portion of the sliding element 4 with the end edge 4c, and the rider 14. The latter has an upwardly extending projection 14b.

When the magazine 3 is located in its track 5, the supporting surface 15a protrudes under the action of the spring 20 into the track 13 for the magazine 11, so that the bracket 15b is so high that the rider 14 with its projection 14b can move under the bracket 14b. The rider 14 can therefore be arranged at the end side 4c of the sliding element 4. When the magazine 11 with the smaller compartment width is inserted into the track 13, the support structure 15 is pressed downwardly by the magazine 11, and thereby the bracket 15b is pressed against the action of the spring 20 in the direction 16. If the rider 14 is located in the position suitable for the magazine 3 with the greater diapositive compartment width at the end side 4c of the sliding element 4 and thereby can take several diapositives during the transportation, the bracket 15b is located in front of the projection 14b and thereby blocks the actuation of the sliding element 4. As a result of this, a user can recognize that it is necessary to displace the rider 14 to its position shown in dotted lines at the end of the sliding element 4, which faces away from the insertion opening 6. In the above described position of the sliding element 4, the operational path of the rider 14 with its projection 14b does not extend to the bracket 15b during transportation of the diapositives by the sliding element 4, and thereby the bracket 15b no longer prevents the displacement of the sliding element 4. Thereby in the situation in which the rider 14 is located at the end side 4c of the sliding element 4 and the magazine 11 with the smaller diapositive compartment width is utilized, the operation of the projection by the sliding element 4 is actually blocked.

In addition to or instead of the blocking arrangement 14b, 15b of FIG. 1, and its control with the aid of the spring 20 and the supporting surface 15a, an electrical blocking arrangement can be utilized. A main switch with contacts 18 and 19 of the projector 1 can be arranged so that only in the position of the rider 14 at the end side 4c of the sliding element 4 with simultaneous utilization of the magazine 11 of the smaller diapositive compartment width, will the main switch open and thereby switch off the projection 11. The supporting surface 15a with a bracket can also be utilized in this arrangement, wherein the bracket 15b' is designed in correspondence with FIG. 2.

The bracket 15b' has a hollow interior in which the above mentioned two contacts 18 and 19 of the main switch are arranged. The upper contact 18 which faces away from the spring 20 is provided with a pin 17 movable in the direction of the arrow 16. The contact 18 is a contact spring which simultaneously forms a control spring. In the upper position of the sensing element 15 against the direction 16, which is not shown in FIG. 1, the switch contact 18 abuts because of its tension against the switch contact 19. The rider 14 is pressed at the end side 4c of the sliding element 4 and the utilization of the magazine 3 is possible.

When the magazine 11 with the smaller diapositive compartment width is introduced into the track 13 without pulling of the rider 14 from its position shown in FIG. 1, the bracket 15b' is pressed in the direction of the arrow 16 to its position shown in FIGS. 1 and 2, via the supporting surface 15a by the magazine 11. Thereby the pin 17 meets the rider 14 and is lifted against the spring action of the switch contact 18 together with the latter, so that the main switch 17, 18 opens and switches off the projector 1. When the rider 14 is displaced back to its position shown in dotted lines suitable for the utilization of the magazine 11, the pin 17 falls downwardly under the action of the switch contact by such a distance until the switch 18, 19 is again closed. Thereby, the right position of the rider 14 for the magazine 11 is again available.

It is to be understood that some other options are also suitable for performing the above described sensing and control. It is possible to utilize not only the mechanical spring-biased sensing element, but also an optoelectronic sensing element. Such a sensing element can be provided with lamps and photoelectric converters which operate so that in the situation of simultaneous presence of the magazine 11 in the track 13 and the rider 14 at the end side 4c, a main switch of the projector is switched off or another, for example magnetic locking element is actuated.

It will be understood that each of the elements described above, or two or more together, may also find a useful application in other types of constructions differing from the types described above.

While the invention has been illustrated and described as embodied in a diaprojector, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A diaprojector for framed diapositives accommodated in at least two magazines differing from one another by different width of their diapositive compartments, comprising means forming at least two different tracks each for a respective one of two magazines with smaller and greater diapositive compartment widths, respectively; means for gradually transporting each of the two magazines by a distance corresponding to the width of the diapositive compartments; diapositive exchange means reciprocating substantially transversely of said tracks to exchange diapositives in the two magazines for demonstration thereof, said diapositive exchange means including a sliding element having a width smaller than the distance between one diapositive and the next one diapositive in a first magazine with a smaller diapositive compartment width so as to be capable of exchanging the diapositives in the first magazine, and a rider having a width which is greater than the width of said sliding element and is smaller than the distance between one diapositive and the next one diapositive in a second magazine with a greater diapositive compartment width so as to be capable of exchanging the diapositives in the second magazine, said rider being movable relative to said sliding element between a first position in which said sliding element is available for exchanging the diapositives in the first magazine and a second position in which alternately said rider is available for exchanging the diapositives in the second magazine; and means for sensing the presence of one of the magazines in a respective one of said tracks and blocking the operation of the diaprojector in response to sensing the fact that said rider is in a position which does not correspond to the one magazine in said one track.

2. A diaprojector as defined in claim 1, wherein said rider moves on said sliding element along a rider path, said sensing and blocking means including a sensing element which extends into the one track for the one magazine so as to sense the presence of the one magazine, said sensing element being displaceable into said rider path so as to prevent the movement of said rider to said second position when the first magazine is in the track.

3. A diaprojector as defined in claim 2; and further comprising spring means urging said sensing element outwardly of said rider path, said sensing element being displaceable into said rider path against force of said spring means when the first magazine is in its track, and displaceable under the action of said spring out of said rider path when the first magazine is not in its track.

4. A diaprojector as defined in claim 3, wherein said sensing element has an abutting surface arranged to cooperate with the first magazine so as to displace said sensing element alternately into and out of said rider path.

5. A diaprojector as defined in claim 4, wherein said sensing element has a bracket overlapping said sliding element and said rider and arranged to prevent and to allow the movement of said rider to said second position by displacement of said sensing element into and out of said rider path, respectively.

6. A diaprojector as defined in claim 1; and further comprising a main switch having two contacts, one of said contacts being movable relative to the other of said contacts between operative and inoperative positions so as to switch on and to switch off the diaprojector, respectively, said sensing and blocking means being arranged so that when the first magazine is in its track but said rider is in said second position, said one contact moves to its inoperative position and switches off the diaprojector.

7. A diaprojector as defined in claim 6, wherein said sensing and blocking means includes a sensing element connected with said mains switch and arranged so that it displaces when the first magazine is in its track, and a movable sensing pin connected with said one contact of said main switch and moving said one contact to said inoperative position when said sensing pin meets said rider in said second position.

8. A diaprojector as defined in claim 1, wherein said diapositive exchange means is a hand-displaceable means.

* * * * *